United States Patent [19]

Bodini

[11] 4,022,565
[45] May 10, 1977

[54] MOLD CLAMPING APPARATUS FOR MOLDING MACHINERY

[75] Inventor: Giovanni Bodini, Varese, Italy

[73] Assignee: Ingersoll-Rand Negri-Bossi S.p.A., Milan, Italy

[22] Filed: Sept. 29, 1975

[21] Appl. No.: 617,319

[30] Foreign Application Priority Data

Oct. 8, 1974 Italy ................. 70001/74

[52] U.S. Cl. .................................. 425/444
[51] Int. Cl.² ................................ B29F 1/00
[58] Field of Search ........... 425/451.6, DIG. 222, 425/444, 451.7, 242 R, 450.1, 451.5, 246, 250, DIG. 221; 100/272, 288, 282; 164/343, 342, 347

[56] References Cited

UNITED STATES PATENTS

| | | | |
|---|---|---|---|
| 2,244,123 | 6/1941 | Sebek | 425/DIG. 222 |
| 2,334,372 | 11/1943 | Abbott et al. | 425/DIG. 222 |
| 2,371,547 | 3/1945 | Rosenlund et al. | 425/DIG. 222 |
| 2,395,100 | 2/1946 | Caron | 425/444 |
| 2,718,662 | 9/1955 | Bohannon et al. | 425/DIG. 221 |
| 3,579,742 | 5/1971 | Muttart | 425/DIG. 222 |
| 3,613,156 | 10/1971 | Jager | 425/444 |

FOREIGN PATENTS OR APPLICATIONS

| | | | |
|---|---|---|---|
| 31,563 | 12/1969 | Japan | 425/DIG. 222 |

Primary Examiner—J. Howard Flint, Jr.
Attorney, Agent, or Firm—Frank S. Troidl

[57] ABSTRACT

Mold clamping apparatus of the type including a crosshead driven to move a movable platen through toggle linkage, wherein the crosshead is guided during its driven movement by a plurality of guide rods which are movable with the movable platen. The guide rods are supported on the tie rods by supporting plates which are connected to connecting rods affixed to the movable platen whereby the connecting rods and supporting plates also move with the movable platen.

8 Claims, 6 Drawing Figures

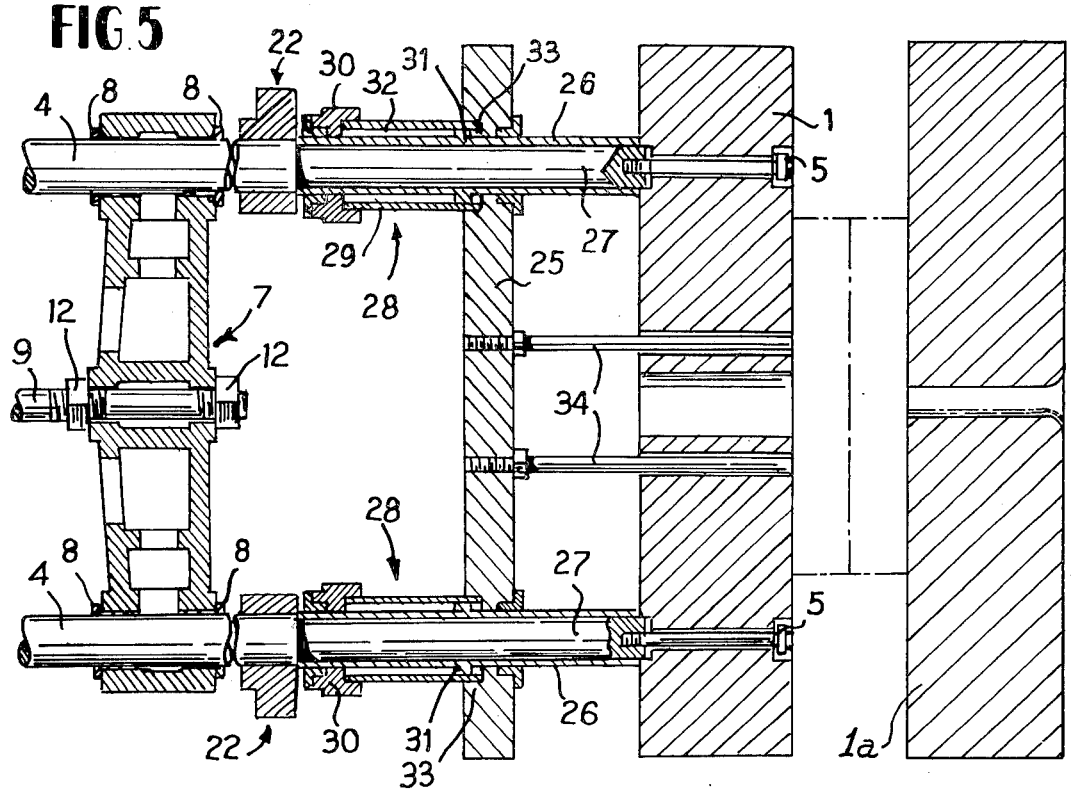
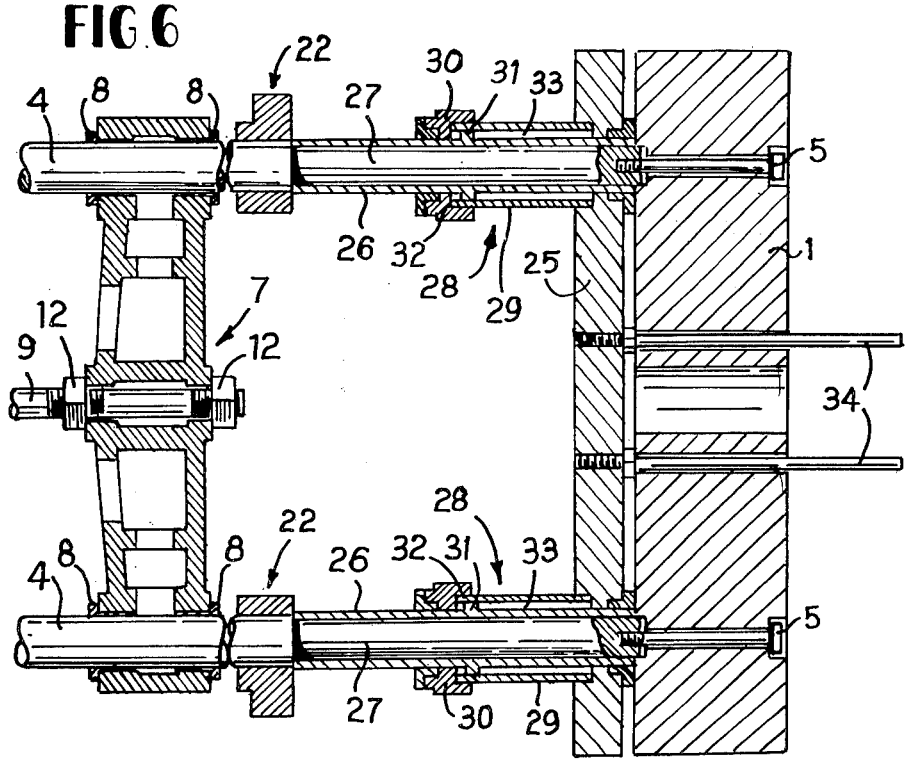

MOLD CLAMPING APPARATUS FOR MOLDING MACHINERY

The present invention relates to molding machinery and more specifically to mold clamping apparatus particularly adapted for molding machinery of the type including a movable platen driven through toggle linkage.

In conventional plastic injection molding machinery of this type, the movable platen is normally slidably supported on a plurality of tie rods and driven by a hydraulic actuator through toggle linkage which may comprise at least one pair or set of links. In each such pair of links, generally, one end of one of the links is pivotally connected to the machine frame while one end of the other link is pivotally connected to the movable platen, the other ends of such links being pivotally connected to one other and simultaneously pivotally connected to one end of a link which at its opposite end is pivotally connected to a crosshead movable in the direction in which the movable platen is driven. The crosshead is guided during its driven movement by a pair of guide rods which are stationary relative to the machine frame and, in fact, each at their ends affixed in openings in the machine frame. Also, the knockout plate carrying the knockout elements which discharge the molded parts is generally mounted to the machine frame and, hence, stationary relative to the machine frame. In such prior art clamping devices, the opening stroke of the moving platen as it travels from its mold closed position to its mold open position is believed to be undesirably limited by the presence of the supports for the crosshead guide rods.

An object of the present invention is to provide new and improved mold clamping apparatus particularly constructed and arranged whereby the crosshead is guided during its driven movement in a novel manner.

Another object of the invention is to provide new and improved mold clamping apparatus particularly constructed and arranged whereby the crosshead is guided in a manner permitting the distance of the travel of the crosshead during its driven movement, and particularly during its driven movement to drive the movable platen from its mold closed position to its open mold position, to be substantially greater than in the aforesaid conventional apparatus.

Another object is to provide new and improved mold clamping apparatus particularly constructed and arranged whereby the crosshead is guided by guide rod means supported on the tie rods of the apparatus.

Another object is to provide new and improved clamping apparatus particularly constructed and arranged whereby the knockout apparatus does not interfere with the driven movement of the movable platen.

Other objects and advantages of the invention will become apparent from the following description taken in connection with the accompanying drawings wherein, as will be understood, the preferred embodiment of the invention has been given by way of illustration only.

In accordance with the invention, mold clamping apparatus for molding machinery, may comprise a plurality of platens, means supporting one of said platens for movement relative to another thereof between a mold closed position and a mold open position, movable crosshead means, toggle linkage means connecting said crosshead means with said one of said platens for causing movement of said crosshead means to move said one of said platens relative to said another thereof, drive means connected to said crosshead means for causing driven movement of said crosshead means, and guide means, connected to said one of said platens for movement therewith, operatively associated with said crosshead means for guiding said crosshead means during its driven movement to prevent lateral displacement of said crosshead means during its said movement.

Referring to the drawing:

FIG. 5 is a sectional view taken on line V—V of FIG. 1, looking in the direction of the arrows; and FIG. 6 is a sectional view, generally similar to that of FIG. 5, but showing the apparatus in position for discharge of a molded part or parts.

Figure 1:
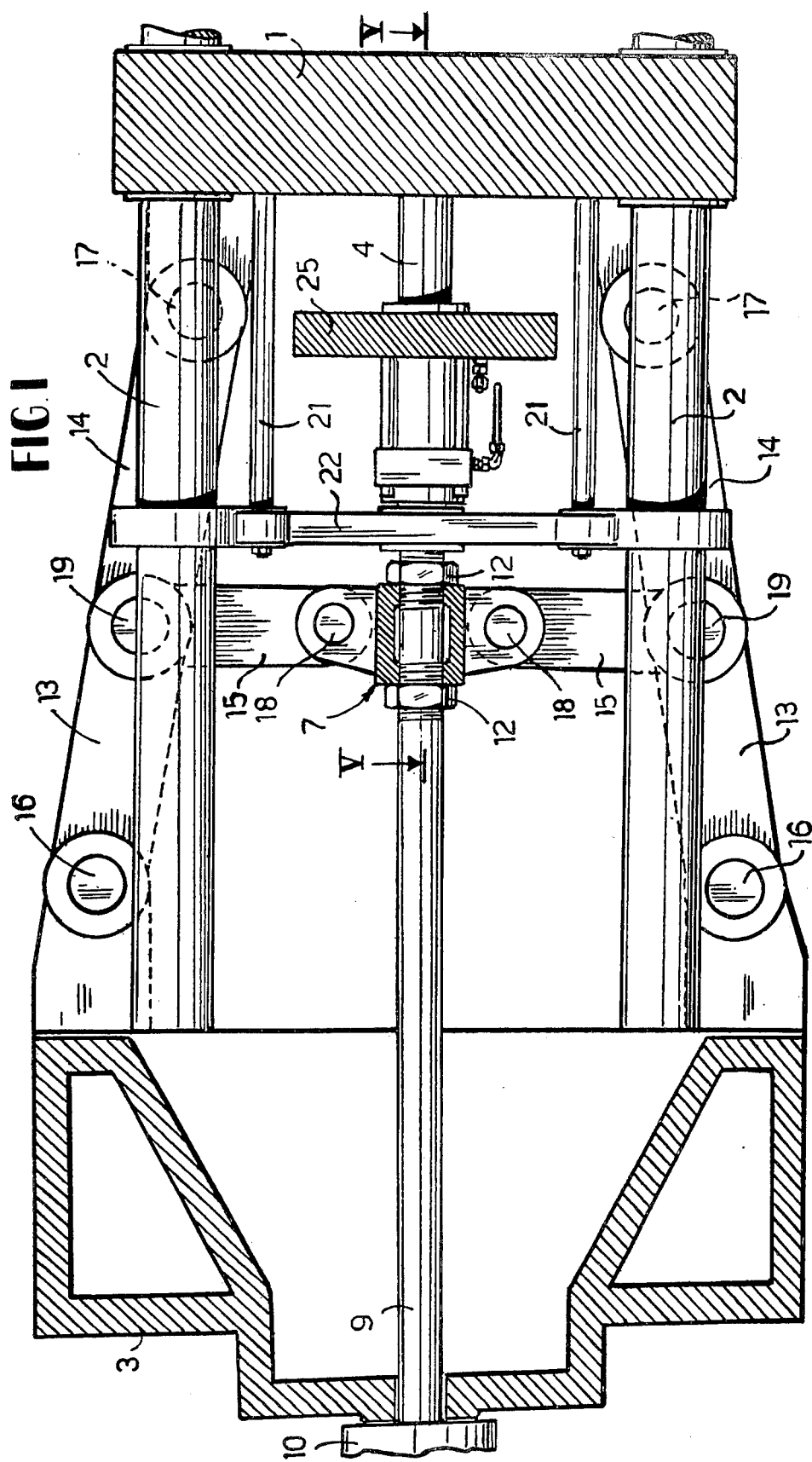
FIG. 1 is a schematic side view illustrating a portion of one embodiment of the invention, with the movable platen in its mold closed position.

Referring more particularly to the drawings wherein similar reference characters designate corresponding parts throughout the several views, FIGS. 1 through 6 schematically illustrate the mold clamping apparatus or portion of a plastic injection molding machine which also includes a conventional injection unit (not shown) arranged in a conventional manner to inject plasticized material into a mold formed by conventional separable mold halves (not shown) carried by the movable and stationary platens 1, 1a, respectively.

Figure 2:
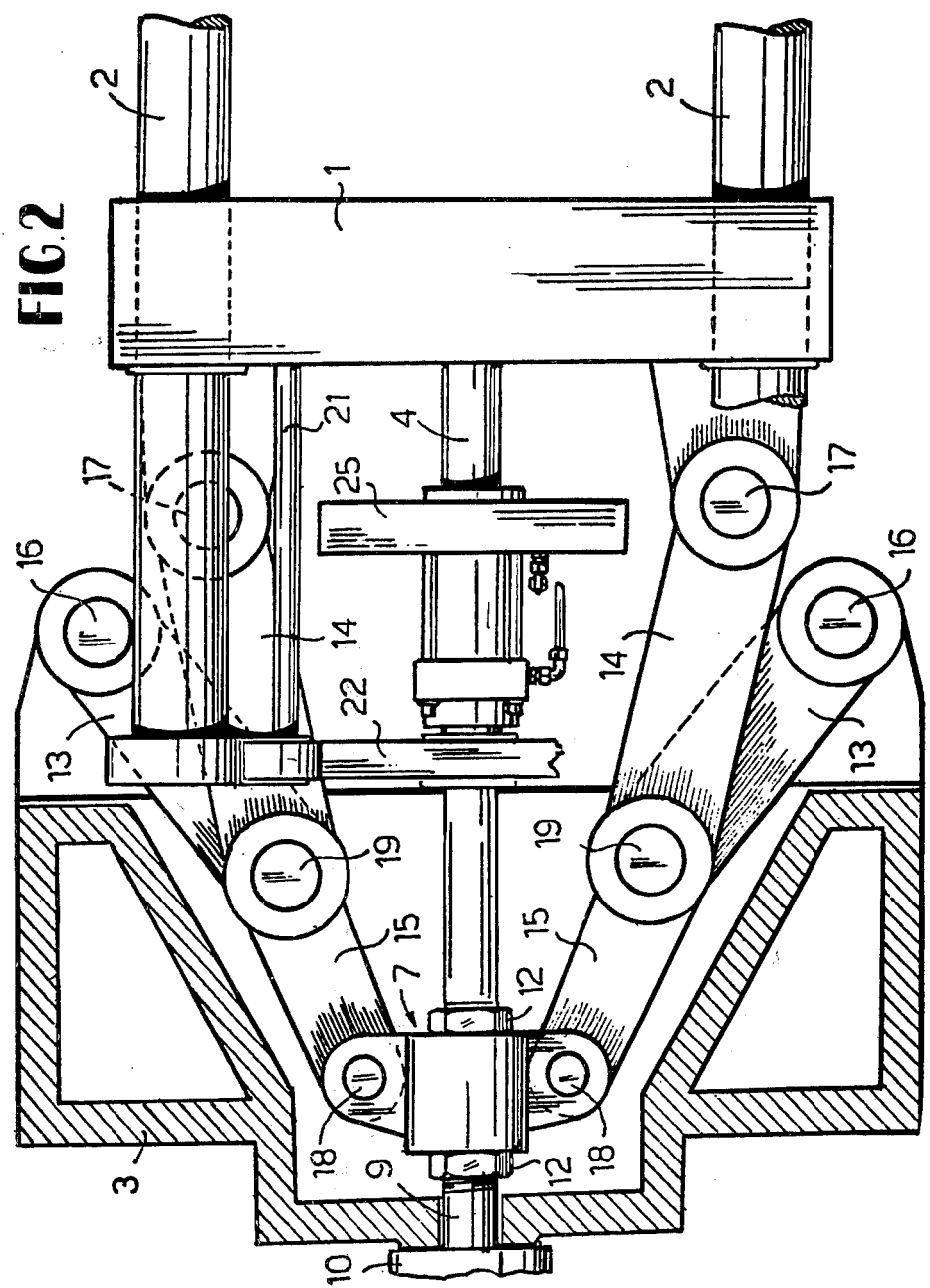
FIG. 2 is a schematic side view generally similar to that of FIG. 1, but with the movable platen on its mold open position.

As schematically illustrated in FIGS. 1 and 2, the movable platen 1 is supported and guided by four tie rods 2 which longitudinally extend slidably through openings in the movable platen 1 and at their opposite ends are shown affixed to the stationary machine frame 3 and to nuts 3a, it being understood that the ends of the tie rods 2 shown affixed to the nuts 3a are supported by the machine frame in a conventional manner. The movable platen 1 carries two guide rods 4 (FIGS. 3, 5 and 6), each having one end affixed to the movable platen 1 by screws 5, which longitudinally extend from the movable platen 1 in the opposite direction from the stationary platen 1a and at their other ends are slidably received in bushings 6 carried by the stationary machine frame 3. A crosshead, designated generally as 7, is slidably supported on the guide rods 4 by bushings 8 carried by the guide rods 4, whereby the guide rods 4 prevent lateral displacement of the crosshead 7 throughout the operation of the molding machine. The central portion of such crosshead 7 is affixed to one end of a stem 9, the other end of which is connected to a piston (not shown) in a hydraulic cylinder 10 mounted on the machine frame 3 and adapted to axially move the crosshead 7 towards and away from the stationary platen 1a. The connection between the crosshead 7 and the stem 9 may be, as shown, by means of a pair of nuts 12 threaded onto correspondingly threaded sections of the stem 9.

Figure 3:
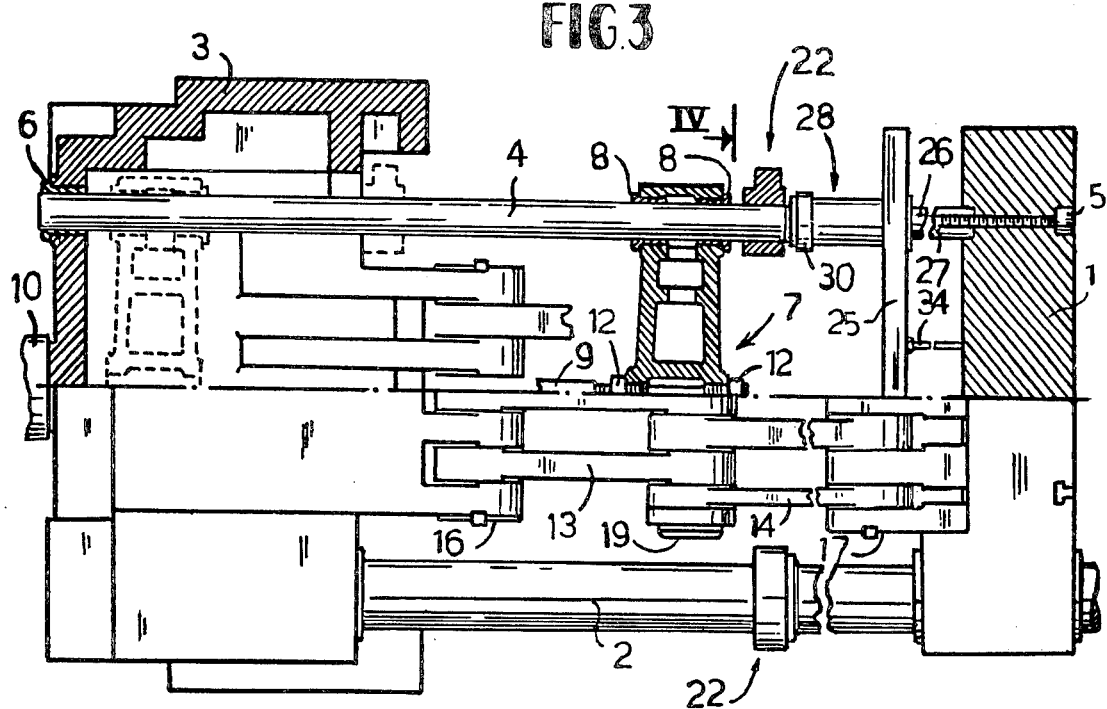
FIG. 3 is a schematic top or plan view, half in section, of such embodiment of the invention with the movable platen in its said mold closed position.
Figure 4:
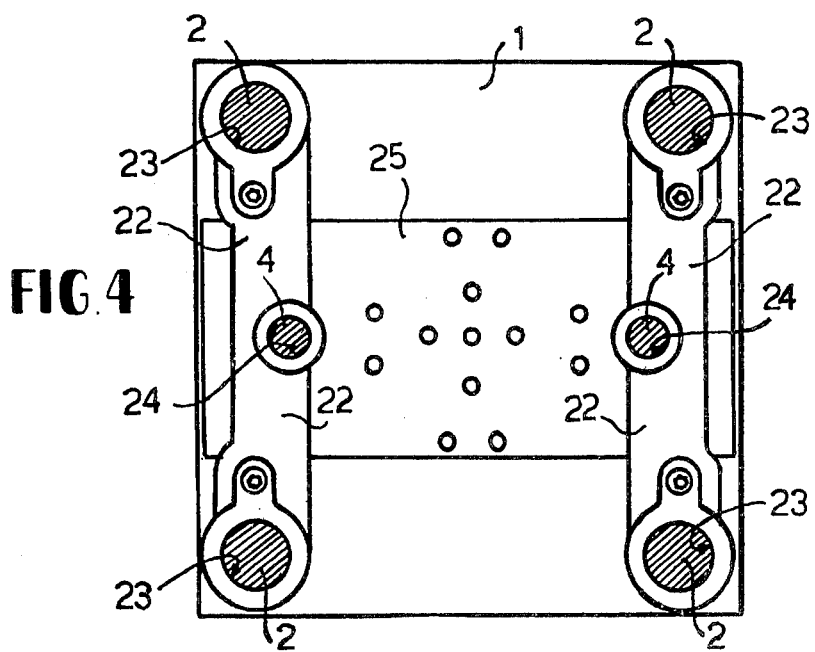
FIG. 4 is a sectional view taken on line IV—IV of FIG. 3, looking in the direction of the arrows.

The crosshead 7 is connected to a toggle linkage means or mechanism which includes a plurality of sets of links 13, 14 and 15 (FIGS. 1, 2 and 3). In each such set of links, one end of the link 13 is pivotally connected by a pivot pin 16 to the machine frame 3; and one end of the link 14 is pivotally connected by a pivot pin 17 to a connecting member affixed to the movable platen 1. Also, in each such link set one end of the link 15 is pivotally connected by a pivot pin 18 to the crosshead 7; and the other ends of all of the links 13, 14 and 15 are pivotally connected to one another by a pivot pin 19. Hence, due to this toggle linkage means, driven movement of the crosshead 7 by the piston contained in the cylinder 10, provides corresponding movement of the movable platen 1 relative to the stationary platen 1a. As will be understood, the toggle linkage means may include any suitable member of sets of the links 13, 14 and 15; and, if desired, other configurations of toggle linkage means operable to cause movement of the crosshead 7 to provide corresponding movement of the movable platen 1, may be substituted for that illustrated and beforedescribed. Affixed to the movable platen 1 are a plurality of connecting rods (FIGS. 1 and 2) which longitudinally extend from the movable platen in the opposite direction from the stationary platen 1a; and affixed to such connecting rods 21 are a pair of supporting elements 22 each including a pair of openings 23 (FIG. 4) slidably receiving a corresponding pair of the tie rods 2, whereby the supporting elements 22 are slidably supported on the tie rods 2. Each said supporting element 22, as shown in FIG. 4, further includes a central opening 24 slidably receiving a corresponding guide rod 4. Hence, each of the guide rods 4, in addition to being supported adjacent its opposite ends, is supported and guided between its ends in one of the openings 24 to prevent any possible deformation of the guide rods 4.

As best shown in FIGS. 5 and 6, a knockout plate 25 is disposed intermediate the movable platen 1 and the supporting elements 22. As illustrated the knockout plate 25 includes a plurality of openings each slidably receiving a sleeve 26 keyed on a corresponding reduced diameter section 27 of one of the guide rods 4. For controlling the displacement of the knockout plate 25 there are arranged hydraulic fluid actuation means, including in the illustrated embodiment two hydraulic cylinders 28 substantially coaxial with the sections 27 of the guide rods 4. Each of the cylinders 28 is provided with a housing 29, one end of which is affixed within a corresponding opening in the knockout plate 25, while the other end thereof has an integral collar 30 sliding over the corresponding sleeve 26. The housing 29 substantially defines with an annular projection 31 of the sleeve 26 two annular chambers 32 and 33 (FIGS. 5 and 6), each of the chambers 32 and 33 being supplied with hydraulic fluid in order to actuate the displacement of the knockout plate 25 in a preset direction. The knockout plate 25 has affixed thereto a plurality of ejector or knockout elements 34 adapted to move into corresponding holes provided on the moving platen 1 or removal of a formed part (or parts).

In the operation of the beforedescribed mold clamping device, with the platens 1, 1a in their mold closed positions (shown in FIGS. 1 and 3) wherein the movable platen 1 is most adjacent to the stationary platen 1a and the mold halves (not shown) carried by the platens 1, 1a are in abutment with one another, the knockout plate 25 is in its limit stroke position (shown in FIG. 5) wherein the knockout elements 34 do not project from their respective openings in the movable platen 1. Also, with the platens 1, 1a so disposed, the crosshead 7 is in its FIG. 1 limit stroke or right hand position, thereby maintaining the axes of the links 13, 14 of each link set coaxial, as also shown in FIG. 1.

The movable platen 1 is driven from its said mold closed position to its mold open position of FIG. 2, by actuation of the hydraulic cylinder 10 to draw the crosshead 7 to the left, as viewed in FIG. 1; the crosshead 7 during its such movement being guided by the guide rods 4 as the bushings 8 slide therealong. Hence, lateral displacement or shifting of the crosshead 7 during its movement is prevented by the guide rods 4. During such opening movement of the crosshead 7, the crosshead 7 acts through the links 15 to displace the links 13, 14 such that the pivot pins 19 are drawn in an accuate path around the pivot pins 16 to move the links 13, 14, 15 from their FIG. 1 positions to their FIG. 2 positions and thereby drive the movable platen 1 from its FIG. 1 mold closed position to its FIG. 2 mold open position. The connecting rods 21, supporting elements 22 and knockout plate 25, move as a unit with the moving platen 1 during its said movement, the knockout plate 25 being locked for such conjoined movement by fluid in the chambers 32, 33. Throughout such opening movement, the axes of the guide rods 4 are maintained perfectly straight by the supporting elements 22 as the guide rods 4 extend through the openings 24 in the supporting elements 22; and the path defined by each opening 24 during the movement of its respective supporting element 22 is perfectly rectilinear. When the crosshead 7 has been moved to its left hand limit stroke position shown in FIG. 2 and denoted in broken lines in FIG. 3, and the links 13, 14, 15 have been moved to their FIG. 2 limit stroke positions whereby the movable platen 1 is resultantly in its FIG. 2 mold open position, the supporting members 22 are, as shown in FIG. 2, in immediate proximity to the machine frame 3.

The movable platen 1 is returned from its FIG. 2 mold open position to its FIG. 1 mold closed position by actuation of the hydraulic cylinder 10 to return the crosshead 7, links 13, 14, 15 and other beforedescribed driven components from their FIG. 2 positions to their FIG. 1 positions. Lateral displacement or shifting of the crosshead 7 is, of course, again prevented during this driven movement thereof by the guide rods.

Cyclically, the movable platen 1 is repetitively so driven throughout the operation of the injection molding machine, plasticized material being introduced into the platen carried mold halves by the machine injection unit (not shown) in a conventional manner while the plates 1, 1a are in their mold closed positions. The molded articles are discharged from the platen carried mold halves during the movement of the movable platen 1 to its mold open position through actuation of the hydraulic cylinders 28 by supply of hydraulic fluid into the chambers 33 while pressurized fluid is drained from the chambers 32, whereby the knockout plate 25 is driven towards the movable platen 1 over the sleeves 26 until the knockout elements 34 project through their respective openings in the movable platen 1. After such discharge of the molded article (or articles) during each cycle of the machine operation, the knockout plate 25 is returned from its FIG. 6 relationship with the movable platen 1 to its normal FIG. 5 relationship therewith, by supply of hydraulic fluid into the chambers 32 while hydraulic fluid is drained from the chambers 33.

It should be noted that the beforedescribed driven movement of the movable platen 1 from its mold closed position of FIG. 1 to its mold open position of FIG. 2, occurs at relatively high speed and substantially faster than usual with mold clamping devices of prior conventional, commercially available, injection molding machines of the same type and length. In addition, as shown in FIGS. 1 and 2, the beforedescribed apparatus does not include any frame components or other members undesirably restricting such driven movement of the movable platen 1, as may occur in prior machines in which support means for the crosshead guide rods (usually in the form of frame components) may considerably limit the possible maximum distance of travel of the driven stroke of the movable platen. Furthermore, it will be seen that the beforedescribed construction minimizes the necessary overall displacement of the knockout plate 25 relative to the movable platen 1 for part discharge.

From the preceeding description, it will be seen that the invention provides new and improved means for attaining all the beforestated objects and advantages. It will be understood, however, that, although only a single embodiment of the invention has been illustrated and hereinbefore described, the invention is not limited merely to this single embodiment, but rather contemplates other embodiments and variations within the scope of the following claims.

I claim:

1. Mold clamping apparatus for molding machinery, comprising a plurality of platens, a plurality of tie rods supporting one of said platens for movement relative to another thereof between a mold closed position and a mold open position, movable crosshead means, toggle linkage means connecting said crosshead means with said one of said platens for causing movement of said crosshead means to move said one of said platens relative to said another thereof, drive means connected to said crosshead means for causing driven movement of said crosshead means, a plurality of guide rods directly connected to said one of said platens for movement therewith, operatively associated with said crosshead means, and extending forwardly and rearwardly of said crosshead means, relative to said crosshead means movement, for guiding said crosshead means during its driven movement to prevent lateral displacement of said crosshead means during its said movement; and guide rod supporting means connected to said tie rods to permit movement of the rod supporting means with said movable platen, and means connecting said movable platen with said guide rod supporting means for conjoined movement by said toggle linkage means.

2. Mold clamping apparatus according to claim 1, where in said guide rods are each connected at one end to said movable platen, said guide rod supporting means comprises supporting elements slidably associated with said tie rods, and further comprising connecting rod means interconnecting said movable platen and said supporting elements for conjoined movement by said toggle linkage means and stationary means slidably supporting the other ends of said guide rods.

3. Mold clamping apparatus according to claim 2, further comprising knockout means for discharging a formed part from a mold between said platens, said knockout means comprising a knockout plate and knockout elements carried by said knockout plate, and said knockout plate being disposed intermediate said movable platen and said crosshead means.

4. Mold clamping apparatus according to claim 2, wherein said crosshead means includes a pair of openings, and each of said openings slidably receives a corresponding said guide rod.

5. Mold clamping apparatus according to claim 2, wherein there are four of said tie rods and two of said guide rods, each said supporting element includes openings slidably receiving a pair of said tie rods and another opening slidably receiving one of said guide rods, and each of said guide rods is between a pair of said tie rods.

6. Mold clamping apparatus according to claim 3, further comprising cylinder means associated with said guide rods for moving said knockout plate relative to said movable platen.

7. Mold clamping apparatus for molding machinery, comprising a plurality of platens, means supporting one of said platens for movement relative to another thereof between a mold closed position and a mold open position, movable crosshead means, toggle linkage means connecting said crosshead means with said one of said platens for causing movement of said crosshead means to move said one of said platens relative to said another thereof, drive means connected to said crosshead means for causing driven movement of said crosshead means, and guide means, connected to said one of said platens for movement therewith, operatively associated with said crosshead means for guiding said crosshead means during its driven movement to prevent lateral displacement of said crosshead means during its said movement; wherein said platen supporting means comprises a plurality of tie rods, and said guide means comprises a plurality of guide rods, and further comprising means supporting said guide rods on said tie rods; wherein aid guide rods are each connected at one said to said movable platen, said guide rod supporting means comprises supporting elements slidably associated with said tie rods, and further comprising connecting rod means interconnecting said movable platen and said supporting element for conjoined movement by said toggle linkage means and stationary means slidably supporting the other ends of said guide rods; further comprising knockout means for discharging a formed part from a mold between said platens, said knockout means comprising a knockout plate and knockout elements carried by said knockout plate, and said knockout plate being disposed intermediate said movable platen and said crosshead means; and further comprising cylinder means associated with said guide rods for moving said knockout plate relative to said movable platen; and wherein each of said cylinder means includes a housing connected to said knockout plate, coaxial with one of said guide rods and displaceable coaxially therewith, said housing defining with an annular projection carried by such guide rod two chambers for receiving hydraulic fluid, adapted to be alternatively supplied into said chambers for controlling the displacement of said housing and hence of the knockout plate relative to the guide rod.

8. Mold clamping apparatus according to claim 7, wherein said annular projection is formed on a sleeve on the related said guide rod.

* * * * *